United States Patent Office

3,817,872
Patented June 18, 1974

3,817,872
CYCLONE SEPARATION METHOD AND
APPARATUS
Richard E. Evans, Highland, and Claude Owen McKinney, Munster, Ind., assignors to Standard Oil Company, Chicago, Ill.
Filed Feb. 7, 1972, Ser. No. 223,951
Int. Cl. C10g 13/18
U.S. Cl. 252—417                    15 Claims

ABSTRACT OF THE DISCLOSURE

Disclosed is a method and apparatus for improving the efficiency of a gas-solid separation system. The conventional system containing a regeneration chamber and one or more sets of cyclones located within the chamber is improved by providing extensive gas-discharge tube "neck-in" in the cyclones and a final-stage solids discharge to an external, low-pressure low-cost separator. The invention has particular application in reducing dust emissions from the regenerator of a fluid catalytic cracking unit.

BACKGROUND OF THE INVENTION

The separation of solids from gases is a necessary step in numerous chemical processes and is of particular importance in the fluid catalytic cracking process. The development of the fluid catalytic cracking process is detailed in many prior art patents and publications, and therefore a detailed discussion of the process is unnecessary here. Generally, the process equipment consists of two main vessels, a reactor and a regenerator which are interconnected by catalyst transfer lines. Hydrocarbon feed to the reactor is vaporized by contact with hot catalyst particles from the regenerator. The catalyst not only vaporizes the hydrocarbon but also effects a cracking of the hydrocarbon molecules which results in a further increase in gas volume. The gaseous cracking product is than separated from the solid catalyst particles by means of cyclone separators located within the reactor. The hot gaseous hydrocarbon products are then cooled and separated for use in blending petroleum products. The solids collected by the cyclones are transferred to the regeneration chamber where they are contacted with an oxygen containing fluidizing gas, normally air. As in the reactor, cyclone separation is employed to separate the catalyst solids from the fluidizing gas, the regenerated catalyst being returned to the reactor and the fluidizing gas being either exhausted to the atmosphere, sent to a power recovery stage, or further treated to remove more of the remaining solids.

The catalyst promotes cracking in the reactor, but its activity is adversely affected by high-carbon coke deposits which build up on the catalyst surface. The function of the regeneration is to remove these deposits by burning the coke and separating the carbonaceous gases thus produced from the regenerated catalyst. It is this separation of the regenerated catalyst solids from the carbonaceous gases with which this invention is primarily concerned.

The general principles of fluidization are described in *Fluidization*, D. F. Othmer, ed., Reinhold Publishing Co. (1956). In order to maintain the solid particles in a properly fluidized state, it is preferred to provide a particle size distribution similar to the following:

| Particle size: | Weight percent |
|---|---|
| 0–40 | 10–25 |
| 40–80 | 50–85 |
| 80+ | 5–25 |

Maintaining the desired distribution is complicated by the fact that attrition of the particles continuously occurs as the particles contact each other and the surfaces of the transfer lines, vessels and internals during their circulation through the process system. In addition, the cyclone separators in the regenerator are unable to recover all of the solids from the gas. While the unrecovered solids represent a statistical distribution, the finer dust-size particles are the most difficult to recover and comprise a large portion of the solids lost. It has long been known that some of the solid particles may be recovered through the use of an electrostatic precipitator, but this alternate requires cooling and conducting the gases to the precipitator and the very high costs of building and operating it. As another alternate, the particles may be permitted to freely pass into the atmosphere while being replaced by make-up catalyst. This often employed alternate is undesirable and is steadily becoming more undesirable because the emitted dust particles contribute to air pollution.

The present invention combines a modified cyclone design with external separation to accomplish a reduction in unrecovered solids of about 60% or more compared to conventional systems and yet the additional capital investment required is an order of magnitude less than that of prior art systems employing external separators. A typical regenerator contains one or more sets of two or three-stage cyclone separators. Each stage is basically a barrel shaped vessel and has a tangential inlet opening in the upper portion, a gas-discharge tube extending through the top of the vessel down approximately to the horizontal level of the inlet opening, and a solids-discharge line or dip-leg located in the bottom of the vessel. The solid-gas mixture is admitted through the inlet opening and forms a downward moving vortex near the periphery of the vessel. Near the bottom of the vessel a second upward moving vortex is formed about the vertical axis of the vessel and inside of the peripheral vortex. The stream thus spirals downward along the periphery of the vessel and then upward near the vertical axis of the vessel. The solids falling along the wall and unable to make the change in direction because of their momentum and density are removed from the solids-discharge line at the bottom of the vessel while the gas and remaining solids are discharged via the overhead gas-discharge tube. This overhead stream is then subject to further cyclone separation in a second and possibly third-stage vessel.

Methods and apparatus are continuously being developed to improve the efficiency of cyclone separation. One of the chief problems in such development is that of maintaining a satisfactory pressure balance between the cyclone system and the regenerator vessel. A suction is created within the cyclone system due to the pressure drop as the gas-solid stream flows through the different stages. While this presure drop results partly from cyclone entry effects and other factors, a major cause of pressure drop is usually the constriction of the gas-solid stream as it enters the gas-discharge tube when exiting a stage. Thus, the pressure in a second stage cyclone will be less than that in the first stage due to this loss of pressure. If a third stage is employed, the pressure in it will be even less since the loss in the first and second stage gas-discharge tubes is cumulative. The importance of this pressure differential between the cyclone system and the regenerator becomes apparent in light of the fact that the solids-discharge line of each stage is in direct communication with the fluidized bed of the regenerator. Unless adjustments are made, the pressure differential might become great enough to prevent the flow of solids downward into the regenerator. Then a flow reversal will occur and the entire separation process will be disrupted. A common method of counteracting this problem is to maintain a head of rather well settled catalyst within a sufficiently long solids discharge line equipped with a special valve. Since the pressure drop increases in each succeeding vessel, a progressively greater head of catalyst is needed in each successive line to counteract the increased pressure differential. Consequently, regenerator and cyclone system design must provide for sufficient height in the solids-discharge lines to counteract the anticipated pressure differential between the cyclone stages and regenerator. This must be done without making the regenerator vessel which houses the equipment unduly high and costly.

One effective and widely used method of improving cyclone efficiency involves "necking-in" the entrance to the gas-discharge tubes of the cyclones. This technique is described in an article in *The Oil and Gas Journal*, March 2, 1964, pp. 117–118 and in a publication of a talk presented at a meeting of the National Petroleum Refiners Association entitled "Removal of Solids from Refinery Effluent Gases," September 26–28, 1967. In a normal cyclone design, the velocity of the exit gases is less than that of the inlet gases because the gas discharge tube entrance is larger than the gas inlet entrance. In a typical design, the entrances are sized so that exit gas velocity is on the order of three-fourths of the inlet gas velocity. "Necking-in" is accomplished by reducing both the inner and outer diameter of the gas-discharge tube at its entrance so that the exit gas velocity is greater than the inlet gas velocity. Suitable designs will greatly improve the efficiency of separation and may include a gas-discharge tube which (a) tapers from its narrow entrance to the larger main section of the discharge tube, (b) is of constant reduced cross-section, or (c) comprises a length of small cross-section connected to one of larger cross-section. From our experience it has been found that dust-recovery efficiency improves dramatically with increasing degree of "neck-in" until the entrance is half the diameter of a normal discharge tube. At this point the efficiency is approximately doubled. Beyond this point benefits are usually small or non-existent. The effect of the "neck-in" design is to alter the velocity patterns within the cyclone and thereby improve the overall efficiency of separation as mentioned. The disadvantage of this design is that the constricted discharge tube entrance increases the pressure drop. The pressure drop at the entrance is approximately in proportion to the square of the gas velocity which in turn is inversely proportional to the square of the diameter of the opening. Consequently, in conventional designs use of the "neck-in" feature is restricted. It can only be employed to the extent that solids discharge lines are of sufficient height to counteract the increased pressure differential. Although it can be used in the last-stage cyclone because there is little effect on the degree of suction in the solids discharge lines, the degree of "neck-in" which may be used in a preceding stage is sharply limited by the height required in the third stage solids discharge line in order to overcome the suction created in the third stage. Unless a special technique is used, the "neck-in" design cannot normally be used to its full extent because the capital investment for increased height of the regenerator vessel is prohibitive.

Canadian Pat. 616,061 teaches another method of separating solids from gases in the regenerator. The patentee desires to recover power from the flue gas from the regenerator by means of an expansion turbine. In order to do so without damaging the turbine blades, it is preferred to remove as large a portion of the solids from the flue gas as is economically feasible. The patentee provides a three-stage cyclone system wherein the third stage consists of a group of small specially designed multiclones from which the separated solids are not returned to the regenerator. Instead, the solids are completely removed from the system. Multiclones are not adaptable to "neck-in" and although the multiclones are of special design and may increase the efficiency of the third stage somewhat, the patentee's design is not adapted to improve the efficiency of the earlier stages.

U.S. Pat. 3,554,903 discloses a further technique for solving the dust emission problem. The patented technique employs two-stage cyclone separation within the regenerator in combination with an external cyclone separation system. The external system is in series with the internal one because the entire gas-solid flue gas stream from the second-stage internal cyclone system passes through the external system as well, and therefore a substantial investment in external equipment is necessary. In addition, the external system does not improve the efficiency of the earlier stages.

None of the foregoing processes provides a significant improvement in overall separation efficiency without a substantial capital investment.

SUMMARY OF THE INVENTION

We have now discovered an economical and more efficient system for reducing dust emissions from a gas-solid separation system which conventionally includes a series of cyclone separators located within a regeneration chamber. In particular, our system is suitable for reducing the emission of fines from the regenerator of a fluid catalytic cracking unit. The final two stages of the cyclone separators are provided with "necked-in" gas-discharge tube entrances, and the final-stage cyclone is provided with a solids-discharge line which is connected to a low-pressure and low-cost external recovery system.

As described earlier, the extent to which "necking-in" can be used to improve cyclone efficiency is frequently limited by the pressure considerations and the available height of the cyclone solids-discharge lines necessary to counteract the resulting pressure differential. Our system does not return solids from the final cyclone stage directly to the regeneration chamber. Instead, the solids are removed from the final stage and transferred to a low pressure external recovery unit. By low pressure we mean a pressure less than that in the regeneration chamber and low enough to insure that the flow of catalyst from the final-stage cyclone to the external separator will not reverse direction. The precise pressure to be maintained in a specific design will be influenced by the design of the cyclone separation system, the pressure in the recovery chamber, the extent to which the cyclone gas-discharge lines are "necked-in" and other factors which contribute to cyclone pressure drop. Where the regeneration chamber is maintained at an absolute pressure between one and one-half and four atmospheres, a pressure slightly above atmospheric in the external separator is normally satisfactory, although other pressures will work as well. The only requirement is that the pressure be sufficiently low enough to stabilize flow in the final-stage cyclone solids-discharge line.

Our system is advantageous because it (a) eliminates the problem of suction in the final cyclone stage as a design limitation, and it (b) prevents solids recovered in the final stage cyclone from recycling to the cyclone system. In our system, only the cumulative pressure drop across those stages preceding the final stage affect the design from a pressure standpoint since the final stage solids discharge line does not communicate with the regenerator. The efficiency of a three-stage system can be attained while suction problems are about equivalent to a two-stage system. Air pollution is reduced by transferring the solids from the final stage to external collection rather than to the regenerator. These recovered solids represent a statistical distribution of particle sizes because the cyclones recover only a given percent of any particular sized material during any one pass. Recycling the final stage solids would increase the amount of fines in the cyclones and therefore increase the losses to the atmosphere.

In a specific three-stage cyclone installation with which we are familiar, pressure and height considerations limited the use of the "neck-in" to the third stage (entrance diameter about one-half that of the main section of the gas-discharge tube). Our invention permits a full neck-in of both the third and second stages. This greatly improves the efficiency of the second stage. In our invention, the dust recovered at the last stage is removed by withdrawal of the underflow to an external recovery system. From there it is discarded, returned, or classified and a portion returned.

The economics of our system are quite favorable in comparison to a system which employs an external separator to process the entire overhead gas stream from the final-stage cyclone. Our external system must process only that very small portion of the total gas stream required to maintain fluidity in the final-stage cyclone solids-discharge line, about 0.1 volume percent or less of the total gas stream. An external separator handling the entire gas volume would be about 100–1000 times greater in size than our separator and would be correspondingly more expensive.

DETAILED DESCRIPTION OF INVENTION

Figure 1:
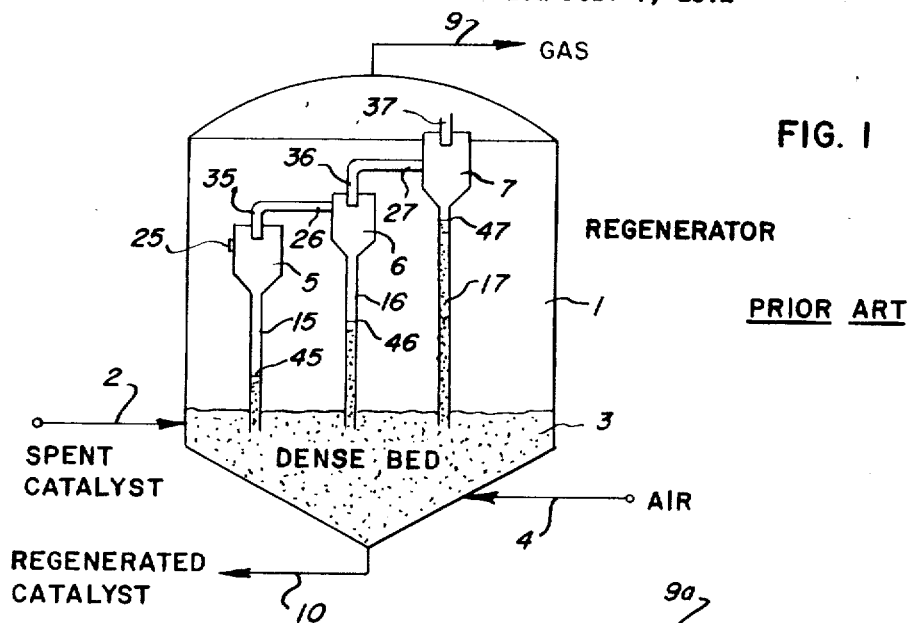
FIG. 1 is an elevational view of a fluid catalyst regenerator of the prior art, partly in section.

FIG. 1 illustrates a typical prior art cyclone separation system used for the recovery of the solid catalyst in a fluid catalytic cracking regenerator. To simplify the drawings, only one set of cyclones is shown but it will be appreciated that our invention applies equally well to systems which include multiple sets of cyclones. Spent catalyst enters the recovery chamber or regenerator 1 through line 2 into catalyst dense bed 3 and oxygen containing gas, usually air, enters the regenerator in the lower portion of the dense bed area through line 4. Cyclone separator stages 5, 6 and 7 are located within the regeneration vessel and are supported by structure not shown. Each of the cyclone stages is provided with a solids-discharge line or dip-leg 15, 16 and 17; inlets 25, 26 and 27; and gas-discharge tubes 35, 36 and 37, respectively. The dip-legs 15, 16 and 17 may be provided with suitable valving not shown which serves to maintain the respective catalyst height 45, 46 and 47 at a level which will counterbalance the pressure drop in the cyclone system. If valves are not used, dependence on dip-leg sealing by the dense bed is involved. In operation, spent catalyst enters through line 2. Catalyst is carried via the oxygen containing gas entering through line 4 and/or through other lines. Catalyst is swept upward and passes through inlet 25 into cyclone 5. A portion of the solids is separated in first-stage cyclone 5, the solids passing downward through dip-leg 15, and the remaining gas and entrained solids leaving the cyclone through gas-discharge tube 35 and passing to second-stage cyclone 6. Further solids separation takes place in the second-stage cyclone and the gas is passed to the third-stage cyclone 7. In the third-stage cyclone the final solids removal occurs and the exiting gas and the remaining dust particles leave the regenerator via line 9 which either exhausts the gas and dust particles to the atmosphere or to external recovery facilities. Regenerated catalyst is withdrawn from the regenerator via line 10 and returned to the reactor. As depicted in FIG. 1, the height of the catalyst which must be maintained in the cyclone dip-leg becomes greater in each successive cyclone stage as a result of the cumulative pressure drop so that the overall pressure drop which may be utilized is limited by the maximum length of the dip-leg which can be used at the final cyclone stage. This in turn is limited by the height of the regenerator vessel and the height of catalyst therein required for combustion of the coke-on-catalyst.

Figure 2:
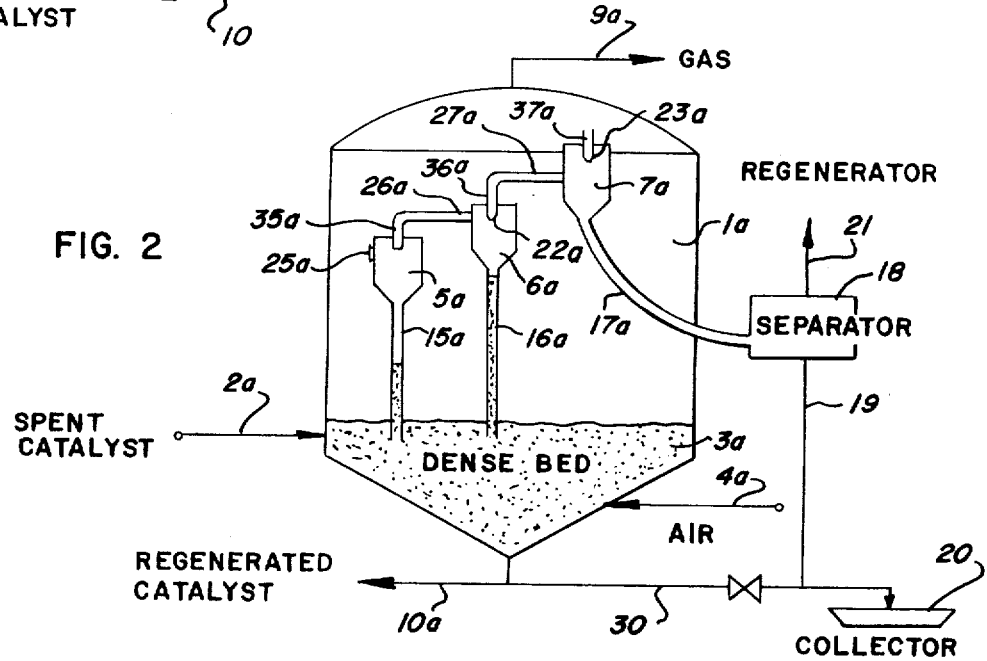
FIG. 2 is an elevational view of a fluid catalyst regenerator system of the present invention, partly in section.

Turning now to FIG. 2, a typical regenerator design of the present invention is illustrated. Spent catalyst enters the recovery chamber or regenerator 1a, through line 2a in the catalyst dense bed 3a and oxygen containing gas enters the regenerator in the dense bed via line 4a. The regenerator is equipped with a three-stage cyclone system containing cyclone stages 5a, 6a and 7a; having inlets 25a, 26a and 27a and gas-discharge tubes 35a, 36a and 37a, respectively. Cyclone stages 5a and 6a have dip-legs 15a and 16a which extend downward into the regenerator. Solids-discharge line 17a of cyclone 7a does not extend to the regenerator, but extends outside of the regenerator vessel and is connected to an external separator 18 which separates the solid dust particles from the associated gas. The flow rate in line 17a is adjusted to be small. This removes all the dust but little gas and makes final solid separation in separator 18 easy and inexpensive. The dust particles pass va line 19 to a dust collector 20. Separated gases leave separator 18 via line 21. Gas-discharge tubes 36a and 37a of second and third-stage cyclones 6a and 7a are provided with "necked-in" entrances 22a and 23a. As in FIG. 1, exhaust gases are removed via line 9a and regenerator catalyst is withdrawn from the regenerator via line 10a.

Figure 3:
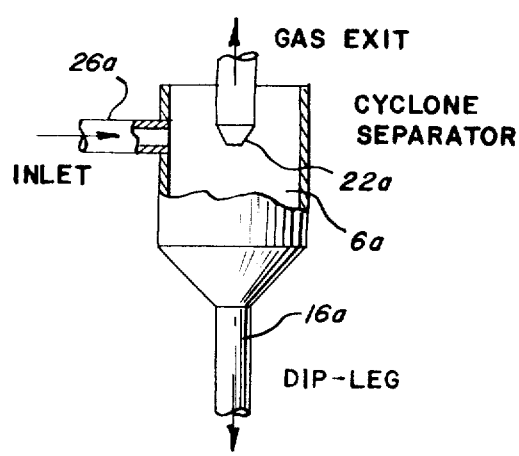
FIG. 3 is an enlarged elevational view of one cyclone design suitable for use in the present invention, partly in section.

The use of the "necked-in" cyclone gas-discharge tube entrance as shown in FIG. 2 serves to greatly increase the efficiency of the cyclone as mentioned. The pressure drop due to the constricted entrance results in a greater pressure differential between the cyclone stages and the regenerator. Possible pressure problems involving flow reversal in the last stage dip-leg are overcome by providing discharge line 17 to a low pressure "sink." The "sink" must be at a pressure well below that of the regenerator. Separator 18 may consist of one or more commonly used gas-solid separation devices including, for example, cyclones, underflow filters and water scrubbers. All or a portion of the solids recovered from the external separator may be returned to the catalytic system via valved transfer line 30. If desired, the separated solids may be classified according to size so that particles having preferred dimensions may be recycled to the main process system. Size classification may be accomplished by any known method such as filtration or elutriation. FIG. 3 illustrates more clearly the design of a "necked-in" gas-discharge tube. Gas and entrained solids enter through line 26a into cyclone stage 6a. The separated solids exit from the cyclone through solids-discharge line 16a. The gas and remaining solids exit through gas-discharge tube 36a provided with a "necked-in" entrance 22a so that the diameter of the gas-discharge tube at the point of entry is substantially less than the diameter of a normal gas-discharge tube.

The particular features of our invention having been described, we claim:

1. In a system for recovering gas-fluidized solids which includes a regeneration chamber for receiving the gas-solids mixture and at least one set of staged cyclone separators, the cyclone separators within each set being in series communication, located within said chamber and consisting of at least two cyclone stages, each of said cyclone stages having attached thereto a gas-discharge tube and a solids discharge line, the improved system comprising:

(1) necked-in gas-discharge tubes attached to the final two cyclone stages in series within each set;

(2) an external gas-solids separator located outside of the regenerator chamber and adapted to be maintained at a pressure less than that in the regeneration chamber; and (3) a closed solids discharge line communicating with a lower section of the final cyclone stage within each set and extending out through the wall of the regeneration chamber to the external gas-solids, separator.

2. The system of Claim 1 which comprises at least one set of three staged cyclone separators within the regeneration chamber.

3. The system of Claim 2 wherein the first-stage cyclone also has a necked-in gas-discharge tube.

4. The system of Claim 1 additionally comprising a valved transfer line attached to the external separator, for dividing the solids recovered from the external separator into two or more streams.

5. The system of Claim 4 additionally including means for separating the externally separated solids according to size.

6. The system of Claim 1 wherein the external separator comprises a cyclone system comprising one or more stages.

7. The system of Claim 1 wherein the external separator comprises a filter system.

8. The system of Claim 1 wherein the external separator comprises a water scrubber.

9. In a process for recovering fluidized solids which includes the steps of introducing the gas-solids mixture into a regeneration chamber and separating the gas from solid catalyst within the chamber by passing the gas together with remaining solids through two or more cyclone separation stages arranged in series, each of said cyclone stages being equipped with a discharge tube for gas and solids remaining therein and a solids discharge line for separated solids, the improved process comprising:
   (1) passing the gas and solids remaining therein in the final two cyclone stages in series through necked-in gas-discharge tubes, whereby a more efficient separation of the solids in said cyclone stage is effected;
   (2) transferring the solids separated in the final cyclone stage, together with a small quantity of fluidizing gas, to an external gas-solids separator maintained at a pressure less than that in the regeneration chamber; and
   (3) further separating the solids from said fluidizing gas within said external separator.

10. The process of Claim 9 wherein the regeneration chamber solids separation is accomplished by passing the gases through at least one three-stage cyclone system, said cyclone stages being arranged in series.

11. The process of Claim 10 wherein the gases are additionally passed through a necked-in discharge tube at the exit from the first cyclone stage.

12. The process of Claim 11 wherein the externally recovered solids are classified according to size.

13. The process of Claim 9 wherein the further separation comprises a cyclone separation step.

14. The process of Claim 9 wherein the further separation comprises a filtration step.

15. The process of Claim 9 wherein the further separation comprises a water scrubbing step.

References Cited

UNITED STATES PATENTS

| | | | |
|---|---|---|---|
| 2,437,352 | 3/1948 | Fragen | 252—417 |
| 2,745,725 | 5/1956 | Ward et al. | 208—164 |
| 3,137,133 | 6/1964 | Wilson et al. | 252—417 |

OTHER REFERENCES

"The Oil and Gas Journal", Mar. 2, 1964, pages 117 & 118.

HERBERT LEVINE, Primary Examiner

U.S. Cl. X.R.

23—288 S; 55—345, 459; 208—161, 164; 209—144